Aug. 10, 1937.       J. B. MONNIER       2,089,399
PLANT FOR THE ARTIFICIAL DRYING OF CERAMIC PRODUCTS
AND IN PARTICULAR OF TILES AND BRICKS
Filed Jan. 7, 1936
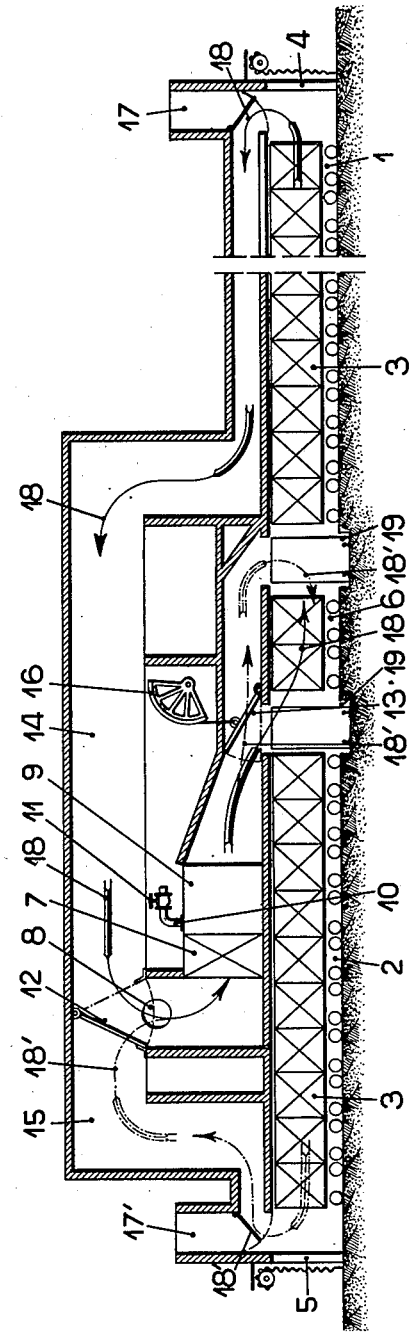
INVENTOR:
Jean B. Monnier
By E. F. Wenderoth
ATTORNEY Patented Aug. 10, 1937

2,089,399

UNITED STATES PATENT OFFICE 2,089,399

PLANT FOR THE ARTIFICIAL DRYING OF CERAMIC PRODUCTS AND IN PARTICULAR OF TILES AND BRICKS

Jean Baptiste Monnier, Gap, France

Application January 7, 1936, Serial No. 57,988
In France January 17, 1935

2 Claims. (Cl. 34—46)

It is known that in actual drying processes use is made of tunnel dryers in which are introduced the products to be dried, placed on small wagons or cars provided with shelves and which are caused to intermittently or continuously move in said tunnel at a speed proportional to the rapidity of drying it is desired to obtain. This rapidity of drying is itself a function of the speed of circulation of the air in the dryer, as well as of the temperature and hygrometric condition of said air, which circulates in reverse direction to that of the displacement of the small wagons or cars.

Actually known tunnel dryers allow of obtaining results which, in general, are satisfactory when ceramic products, and in particular tiles or bricks made of clay relatively porous or of normal shrinkage, are to be dried. In the case under consideration, the drying of the brick or tile requires about thirty-six hours. This is not so for products which, owing to their chemical composition or physical structure, have a small capillarity or a high shrinkage, this necessitating the slowing down of the drying in order to avoid distortions and the production of cracks, particularly when tiles or bricks of large dimensions are being treated. In fact, cases are known in which the drying lasts from seventy to one hundred and twenty hours, cases in which the output of the artificial dryers becomes so small that for obtaining an advantageous industrial production, it is necessary to use plants which are too large and, consequently, too costly. This is the reason why it has not heretofore been possible to use some qualities of clay in the ceramic art and in particular in the manufacture of tiles.

The improvements forming the subject-matter of the present invention allow of remedying these inconveniences.

In fact, they allow of utilizing clays of small capillarity and high shrinkage and of materially reducing the time required for drying, without causing any distortion or crack in the dried products.

The improved process forming the subject-matter of the invention is based on the fact that it has been found that these distortions and cracks occur before the shrinkage of the clay is terminated, and once this shrinkage is terminated, it is possible, without inconvenience, to accelerate the drying operation for eliminating the quantity of water (about 8%) still remaining in the treated products.

According to the invention, the drying of ceramic products, and in particular of bricks and tiles made of clay having a small capillarity and a high shrinkage, is effected in two phases. During the first phase, the products to be dried are exposed intermittently to the action of hot air in circulation, and as soon as the shrinkage is terminated, said products are subjected to a final intense drying, so as to eliminate the remainder of the moisture.

During the time the ventilation is stopped in the first phase, the moisture within the products to be dried moves towards the surface and the ends of said products, which moisture is subsequently removed when the ventilation is resumed, without production of cracks or distortions, which would inevitably happen if the ventilation was continuous.

Another object of the invention is to provide an improved dryer for carrying out the process which has just been described. This dryer is constituted by a passageway comprising a plurality of and preferably two main tunnels, in which the first phase of drying by intermittent ventilation is effected.

These main tunnels are provided on either side of an auxiliary tunnel of smaller length arranged in the middle portion of the dryer and in which the products removed from any of the main tunnels after completion of shrinkage, are subjected to the final intense drying constituting the second phase of the process. Said dryer is also characterized by the application of means allowing hot air to be sent at will in either of the main tunnels and to reverse at the same time the direction of circulation of the heating fluid through the auxiliary middle tunnel, through which said fluid always passes, in one direction or the other.

This result is obtained according to the invention by utilizing a system of associated valves controlled together and intermittently by any suitable mechanism, so that when one of the valves is in the open position, the other is in the closed position, and vice versa.

A form of construction of the improved dryer according to the invention is diagrammatically illustrated, by way of example only, in the accompanying drawing.

As will be seen from the single figure of this drawing, the tunnel dryer, applicable in particular to the drying of bricks and tiles, comprises two main tunnels 1 and 2, having the same length, arranged in alignment with each other and each adapted to receive a train of small wagons 3 provided with shelves, this train entering each of these tunnels through the corresponding door 4 or 5. Between these two main tunnels and in the middle portion of the dryer is provided an auxiliary tunnel 6 which, in the form of construction illustrated, receives two small wagons 3, loaded with products the shrinkage of which is terminated and adapted to be subjected to the final intense drying.

The dryer is provided, in conventional manner, with a fan 7 which, according to requirements, draws in atmospheric air through an adjustable opening 8; this air is delivered through a radiator 9 which is supplied with steam arising either from a suitable steam engine, or from a boiler (engine or boiler not shown in the drawing), the outflow of this steam being controlled by a cock or valve 11. This fan can also draw in hot air recovered in the oven, in the zone where the products are cooled, and it can also draw in hot air arising from a furnace provided for that purpose.

The dryer which has just been described operates as follows:

The air entering from the exterior through the opening 8 is set in motion by the fan 7; it passes through the radiator 9, in which it is raised to the desired temperature by suitable adjustment of the passageway of the cock or valve 11 provided in the pipe line 10.

In the position shown in full lines in the drawing, the valves 12 and 13 compel the ventilating air to pass through the tunnel 6 and, subsequently, through the tunnel 1 for returning, through the return conduit 14, to the fan 7 from which it is again sent through radiator 9, tunnels 6 and 1 and return conduit 14, continuing the circuit in which it circulates during five minutes, for instance until the mechanism diagrammatically shown at 16 and adapted to simultaneously control the valves 12 and 13, causes these latter to suddenly assume the position indicated in dotted lines.

In these conditions, the ventilation of tunnel 1 is interrupted, and the heating fluid is compelled to pass through tunnel 6 in reverse direction, for subsequently circulating through tunnel 2, from which it returns to the fan through the other return conduit 15 which is in alignment with conduit 14.

After a further interval of five minutes, the control mechanism 16 suddenly moves back valves 12 and 13 to their original position, that is to say the circulation of the heating fluid is interrupted in tunnel 2, whilst it is reestablished in tunnel 1 and is reversed in tunnel 6. The latter is thus continuously ventilated; it is only the direction of circulation which changes from one interval of time to the other. It is to be understood that said interval of time is variable according to circumstances and according to the nature of the clay treated. It is moreover to be understood that atmospheric air drawn in through the adjustable opening 8 can also be mixed in variable proportions with the damp air circulating in the return circuits. According to the working conditions of the plant, it is also possible, if it is considered necessary, to evacuate at 17 or at 17' any required quantity of saturated air.

As is previously indicated, when the products of a wagon placed at the inner end of one of the main tunnels have dried to complete shrinkage, said wagon is moved into the secondary middle tunnel 6 where it is subjected to a second drying operation, that is to say the final intense drying.

In the form of construction illustrated, it has been assumed that in the secondary tunnel 6 are simultaneously treated two wagons subjected to the action of the heating fluid alternately circulating in reverse directions, that is to say sometimes in the direction of the arrow 18 and sometimes in the direction of the arrow 18'.

The two wagons placed in tunnel 6 are removed, by means of travelling platforms, through two side doors 19 and 19' provided in the middle portion of the dryer. It is by means of the same travelling platforms that a wagon is removed from the main tunnels 1 and 2 for introducing it in the secondary tunnel 6.

The main tunnels 1 and 2 are then entered through their respective doors 4 or 5, and the entire train of wagons is pushed into each of these tunnels according to a distance corresponding to the length of a wagon. A wagon of products to be dried is then introduced in each of the tunnels 1 and 2 and the doors 4 and 5 are closed.

As the temperature of the drying air is not, generally speaking, too high, it is unnecessary to stop the ventilation during the manipulation of the wagons.

In the dryer according to the invention, the drying very efficiently takes place since, whilst the products, in the secondary tunnel, are subjected to a continuous and powerful drying during two hours, those treated in the main tunnels are subjected to a slow drying during twenty hours, each of these main tunnels containing, in the example illustrated, ten wagons for two in the secondary tunnel.

It will also be noted that the process just described ensures a most methodical drying in the main tunnels, the wagons being pushed in a direction reverse to that of the circulation of the air, that is to say the products introduced in said tunnels are first brought in contact with air moistened owing to its passage in the remainder of the tunnel and are progressively brought in contact with air less saturated with steam, in proportion as the wagons move forward towards the middle portion of the dryer which is in the immediate neighbourhood of the source of heat.

What I claim is:

1. A plant for the artificial drying of ceramic products by the passage of a heating fluid thereover, comprising a passageway including a plurality of main tunnels and an auxiliary relatively short tunnel interposed between said main tunnels, means for heating the heating fluid, means for propelling the latter through said tunnels, and means for intermittently reversing the direction of flow of said heating fluid through said auxiliary tunnel and for causing the said fluid to flow intermittently through one main tunnel or the other depending on the direction of flow through the auxiliary tunnel.

2. A plant for the artificial drying of ceramic products by the passage of a heating fluid thereover, comprising two end drying tunnels and an intermediate auxiliary drying tunnel, the said end tunnels being substantially longer than said auxiliary tunnel, and means for selectively circulating said heating fluid through said auxiliary tunnel in one direction and through one end tunnel or through said auxiliary tunnel in the other direction and through the other end tunnel.

JEAN BAPTISTE MONNIER.